US010744422B2

(12) United States Patent
Sato et al.

(10) Patent No.: US 10,744,422 B2
(45) Date of Patent: Aug. 18, 2020

(54) SEPARATION DEVICE

(71) Applicant: IHI CORPORATION, Tokyo (JP)

(72) Inventors: Naoki Sato, Tokyo (JP); Kunihiko Nakano, Tokyo (JP); Takuya Yoshinoya, Tokyo (JP); Yuping Liu, Tokyo (JP); Ryutaro Nakayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 14 days.

(21) Appl. No.: 16/171,457

(22) Filed: Oct. 26, 2018

(65) Prior Publication Data

US 2019/0060781 A1 Feb. 28, 2019

Related U.S. Application Data

(63) Continuation-in-part of application No. PCT/JP2017/016973, filed on Apr. 28, 2017.

(30) Foreign Application Priority Data

Apr. 28, 2016 (JP) .................. 2016-090602

(51) Int. Cl.
*B01D 3/14* (2006.01)
*B01D 3/16* (2006.01)
(52) U.S. Cl.
CPC ............... *B01D 3/166* (2013.01); *B01D 3/14* (2013.01)
(58) Field of Classification Search
CPC .................. B01D 3/14; B01D 3/166
(Continued)

(56) References Cited

U.S. PATENT DOCUMENTS 497,857 A * 5/1893 Bullock
2,754,096 A * 7/1956 Welty, Jr. ............. B01D 3/18
261/97

(Continued)

FOREIGN PATENT DOCUMENTS

CA 2 574 113 A1 2/2006
CA 2 613 674 A1 3/2007
(Continued)

OTHER PUBLICATIONS

Japan Patent Office, "Notice of Reasons for Refusal," issued in Japanese Patent Application No. 2018-514737, which is a Japanese counterpart of U.S. Appl. No. 16/171,457, dated Nov. 19, 2019, 6 pages (3 pages of English translation of Office Action and 3 pages of original Office Action).

(Continued)

*Primary Examiner* — Charles S Bushey

(57) ABSTRACT

Provided is a separation device, including: a gas-liquid contact flow passage having a distillate discharge port formed on one end side and a bottom product discharge port formed on another end side; a raw material liquid introduction port formed between the distillate discharge port and the bottom product discharge port in the gas-liquid contact flow passage; a stripping section, which is provided between the raw material liquid introduction port and the bottom product discharge port and is configured to heat a liquid in the gas-liquid contact flow passage; a rectification section, which is provided between the raw material liquid introduction port and the distillate discharge port and is configured to cool a gas in the gas-liquid contact flow passage; and a porous body arranged in the gas-liquid contact flow passage.

5 Claims, 10 Drawing Sheets

(58) Field of Classification Search
USPC .................................... 261/146, 147, 148
See application file for complete search history.

(56) References Cited

U.S. PATENT DOCUMENTS

| | | | | |
|---|---|---|---|---|
| 3,083,148 | A * | 3/1963 | Mojonnier | B01D 3/22 |
| | | | | 202/158 |
| 3,309,295 | A * | 3/1967 | Cahn | B01D 3/322 |
| | | | | 202/153 |
| 3,322,411 | A * | 5/1967 | Moore | B01D 47/06 |
| | | | | 261/96 |
| 3,871,969 | A * | 3/1975 | Chapman | B01D 3/24 |
| | | | | 202/234 |
| 4,995,945 | A * | 2/1991 | Craig | A23L 2/64 |
| | | | | 159/12 |
| 6,111,117 | A | 8/2000 | Hartmann et al. | |
| 2006/0016215 | A1 | 1/2006 | Tonkovich et al. | |
| 2006/0016216 | A1 | 1/2006 | Tonkovich et al. | |
| 2009/0263288 | A1 | 10/2009 | Suzuki et al. | |
| 2010/0071410 | A1 | 3/2010 | Tonkovich et al. | |
| 2010/0247429 | A1 | 9/2010 | Ohsaki et al. | |
| 2014/0284824 | A1 | 9/2014 | Bechtel et al. | |
| 2015/0231526 | A1 * | 8/2015 | Moorkanikkara | B01D 3/14 |
| | | | | 366/348 |
| 2016/0230133 | A1 * | 8/2016 | Peterson | C12H 6/02 |

FOREIGN PATENT DOCUMENTS

| | | |
|---|---|---|
| CN | 101035601 A | 9/2007 |
| CN | 101291729 A | 10/2008 |
| EP | 0 188 387 A2 | 7/1986 |
| EP | 1 941 941 A1 | 7/2008 |
| EP | 2 412 415 A1 | 2/2012 |
| JP | S50-022503 A | 3/1975 |
| JP | 2008-507394 A | 3/2008 |
| JP | 2009-106916 A | 5/2009 |
| JP | 2012-130918 A | 7/2012 |
| JP | 2015-223580 A | 12/2015 |
| KR | 10-2008-0059413 A | 6/2008 |
| KR | 10-1306214 B1 | 9/2013 |
| TW | 200724215 A | 7/2007 |
| WO | 2006/019658 A2 | 2/2006 |
| WO | 2007/032810 A2 | 3/2007 |
| WO | 2007/049559 A1 | 5/2007 |

OTHER PUBLICATIONS

Byoung Chul Kim et al., "Energy-Efficient Diabatic Distillation Using a Horizontal Distillation Column," Industrial & Engineering Chemistry Research, 52, pp. 14927-14935 (2013), American Chemical Society.

International Search Report received for PCT Patent Application No. PCT/JP2017/016973 dated Aug. 1, 2017, 4 pages (2 pages of English translation of International Search Report, and 2 pages of International Search Report).

K. F. Lam et al., "On-Chip Microscale Distillation for Acetone-Water Separation," 14th International Conference on Miniaturized Systems for Chemistry and Life Sciences, Oct. 3-7, 2010, Groningen, The Netherlands, pp. 357-359, [online] https://www.rsc.org/binaries/loc/2010/pdfs/papers/124_0199.pdf [Accessed Apr. 3, 2019].

European Patent Office, "Supplementary European Search Report," issued in European Patent Application No. 17 789 721.2, which is a European counterpart of U.S. Appl. No. 16/171,457, with an issuance date of Mar. 15, 2019, 5 pages.

The International Bureau of WIPO, "International Preliminary Report on Patentability," issued in International Application No. PCT/JP20171016973, of which U.S. Appl. No. 16/171,457 is a bypass continuation application, dated Nov. 8, 2018, 7 pages.

* cited by examiner

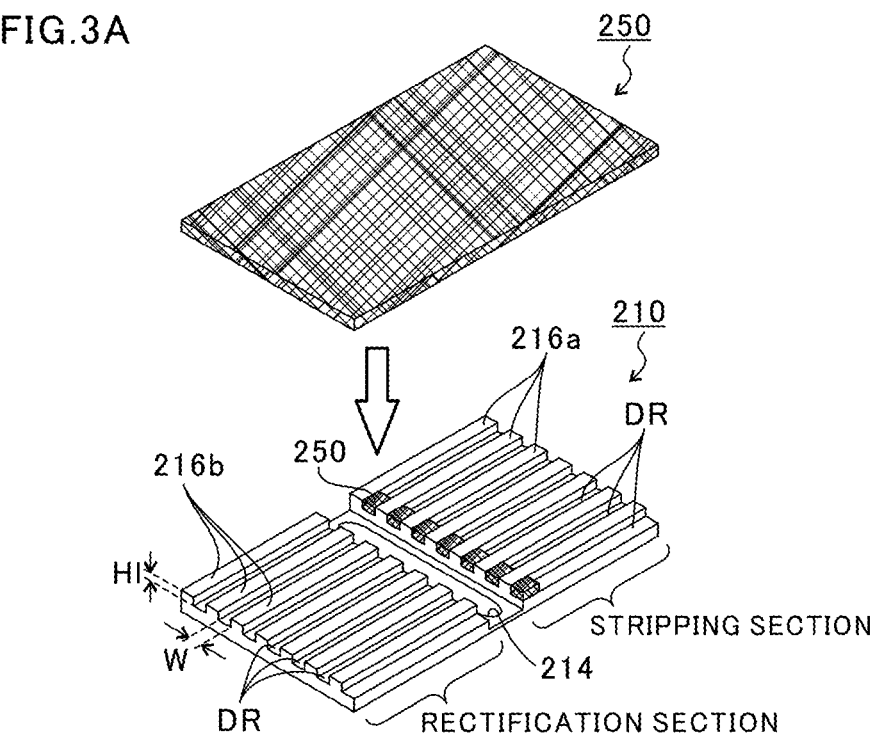
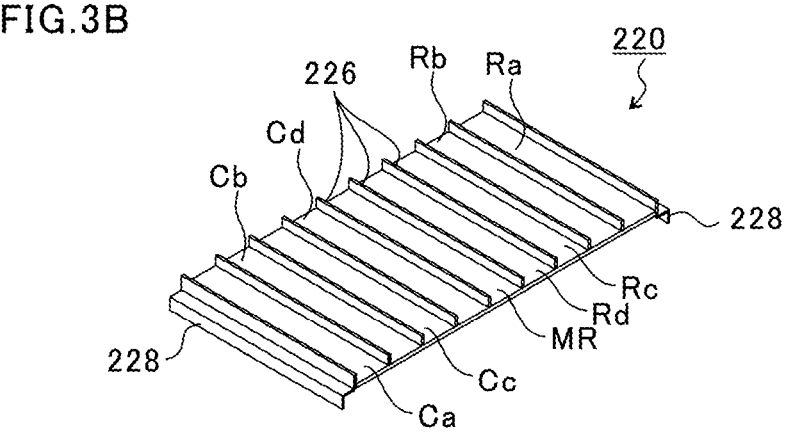
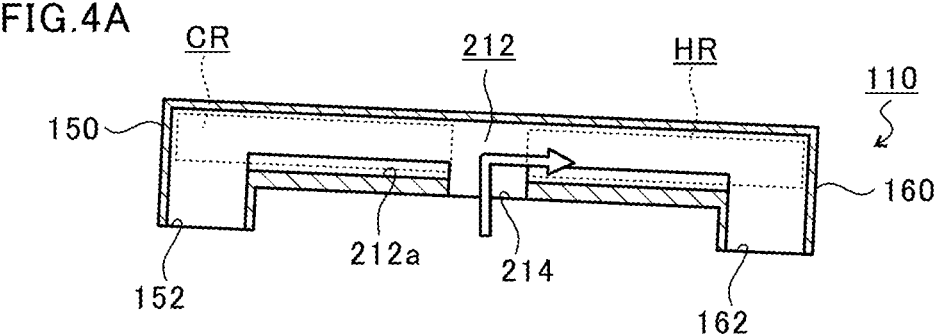

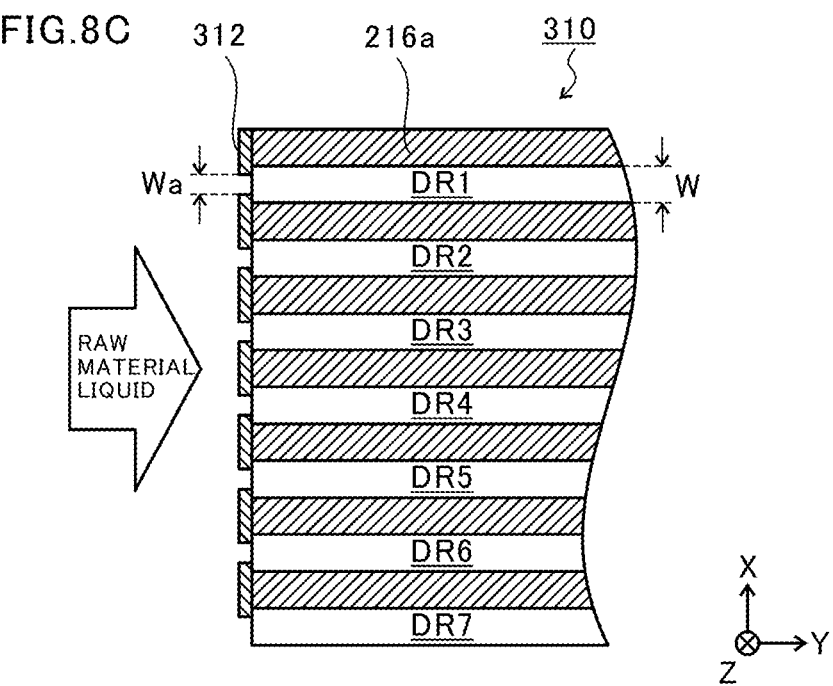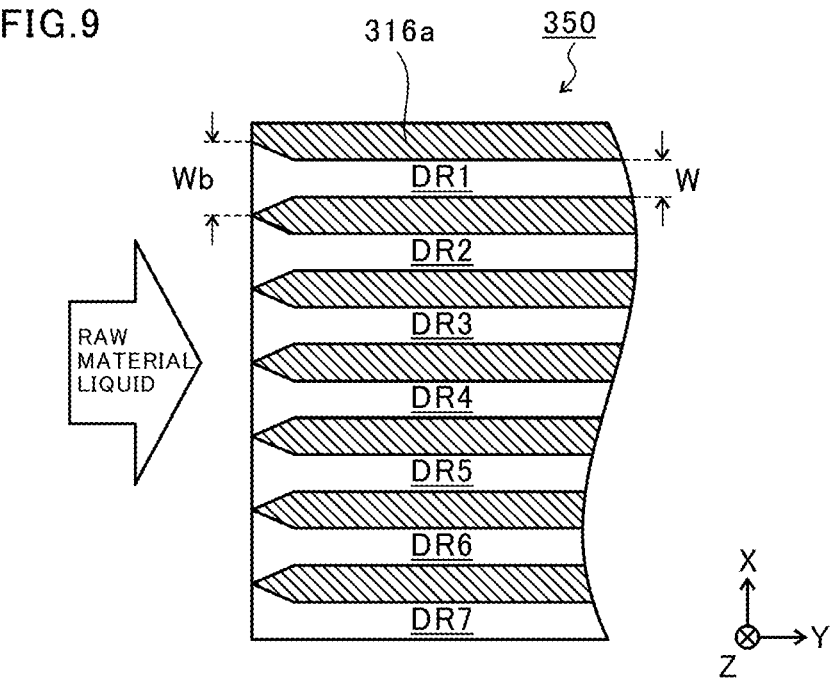

SEPARATION DEVICE

CROSS REFERENCE TO RELATED APPLICATIONS

This application is a continuation-in-part application of International Application No. PCT/JP2017/016973, filed on Apr. 28, 2017, which claims priority to Japanese Patent Application No. 2016-090602, filed on Apr. 28, 2016, the entire contents of which are incorporated by reference herein.

BACKGROUND ART

Technical Field

The present disclosure relates to a separation device configured to separate a raw material liquid containing a low-boiling point component and a high-boiling point component into a distillate and a bottom product.

Background Art

As a device configured to perform distillation of an alcoholic beverage, a petrochemical product, and the like, removal of ammonia, and recovery of carbon dioxide, a plate column has hitherto been developed. The plate column is a device in which a plurality of plates are arranged at predetermined intervals in a vertical direction in a cylindrical column, and contact between a gas and a liquid (gas-liquid contact) is performed between the plates (stages) in a step-by-step manner. In the plate column, a gas phase containing a low-boiling point component in a relatively large amount is sent to an upper stage, and a liquid phase containing a high-boiling point component in a relatively large amount flows down to a lower stage. The plate column is formed so that a gas-liquid equilibrium holds in each stage.

In the above-mentioned plate column, it is required to ensure a distance between the plates (height of each stage) of at least several tens of centimeters (for example, about 60 cm) in terms of a plate structure. Thus, the plate column has a problem in that, when the number of stages is increased in order to improve the separation performance, the device itself is increased in height in the vertical direction. Further, the plate column also has a problem in that the device itself entails large cost due to the complicated structure in the column.

In view of the foregoing, there is disclosed a technology of forming a plurality of groove flow passages configured to propel a liquid with a capillary force in a lower part of a box-shaped flow passage extending in a horizontal direction (for example, Patent Literature 1). In the technology of Patent Literature 1, a raw material liquid is distilled by introducing the raw material liquid into the groove flow passages and heating part of the groove flow passages. Further, in the technology of Patent Literature 1, a height of a gas layer, which is formed in an upper portion of the groove flow passage and allows flow of a gas generated from the heated raw material liquid, is set to be as low as about several millimeters, and gas-liquid contact is performed on a surface of a liquid phase in the groove flow passage. With this, a time period required for a gas-liquid equilibrium to be achieved can be significantly shortened, and even when the device is downsized, the separation performance for separation of a low-boiling point component and a high-boiling point component can be maintained or improved as compared to that of the plate column.

CITATION LIST

Patent Literature

Patent Literature 1: Japanese Patent Application Laid-Open No. 2009-106916

SUMMARY

Technical Problem

There is a demand for development of a technology of further improving the separation performance in the above-mentioned separation device having the flow passages decreased in height.

In view of the above-mentioned problems, an object of the present disclosure is to provide a separation device capable of further improving the separation performance.

Solution to Problem

In order to solve the above-mentioned problems, according to one embodiment of the present disclosure, there is provided a separation device, including: a gas-liquid contact flow passage having a distillate discharge port formed on one end side and a bottom product discharge port formed on another end side; a raw material liquid introduction port formed between the distillate discharge port and the bottom product discharge port in the gas-liquid contact flow passage; a stripping section, which is provided between the raw material liquid introduction port and the bottom product discharge port and is configured to heat a liquid in the gas-liquid contact flow passage; a rectification section, which is provided between the raw material liquid introduction port and the distillate discharge port and is configured to cool a gas in the gas-liquid contact flow passage; and a meandering flow passage forming portion, which is arranged in the gas-liquid contact flow passage and forms a meandering flow passage configured to cause a flow of the gas to meander.

The meandering flow passage forming portion may be formed of a porous body.

The meandering flow passage forming portion may be formed of one or more baffles extending in a direction crossing an imaginary straight line that connects the distillate discharge port and the bottom product discharge port to each other.

A bottom surface of the gas-liquid contact flow passage may be inclined vertically downward from the distillate discharge port to the bottom product discharge port.

Effects of Disclosure

According to the present disclosure, the separation performance can further be improved.

BRIEF DESCRIPTION OF THE DRAWINGS

FIG. 3A is an explanatory view for illustrating a gas-liquid contact unit and porous bodies.

FIG. 3B is an explanatory view for illustrating a heat medium unit.

FIG. 4A is a first explanatory view for illustrating flows of a liquid and a gas in a gas-liquid contact flow passage.

FIG. 8C is a partial top view of FIG. 8A.

FIG. 9 is a partial top view of the gas-liquid contact unit.

DESCRIPTION OF EMBODIMENTS

Figure 1A:
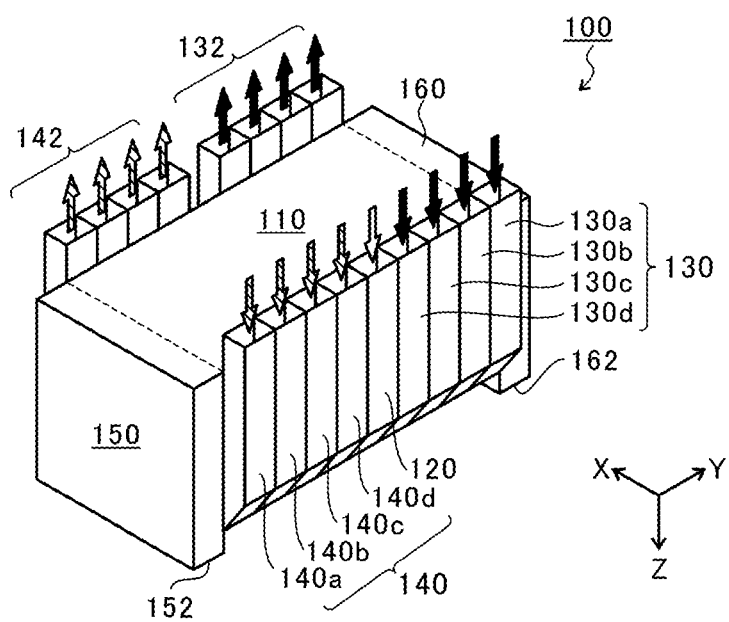
FIG. 1A is a perspective view of a separation device according to a first embodiment.

Now, with reference to the attached drawings, preferred embodiments of the present disclosure are described in detail. The dimensions, materials, and other specific numerical values represented in the embodiments are merely examples used for facilitating the understanding of the disclosure, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

First Embodiment: Separation Device 100

Figure 1B:
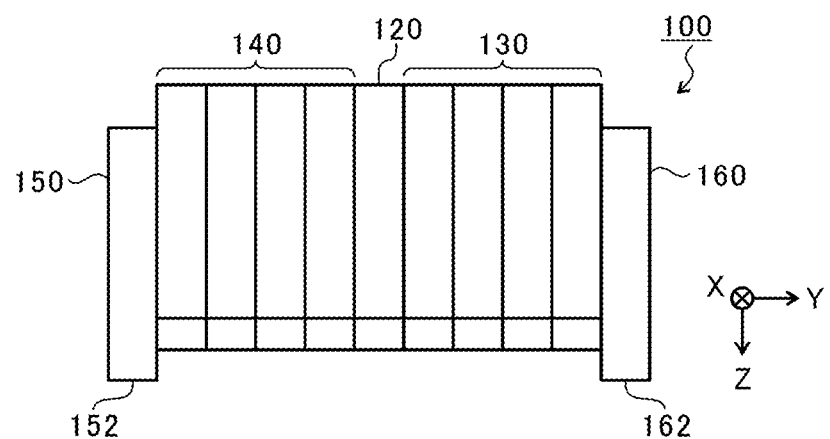
FIG. 1B is a first side view of the separation device according to the first embodiment.
Figure 1C:
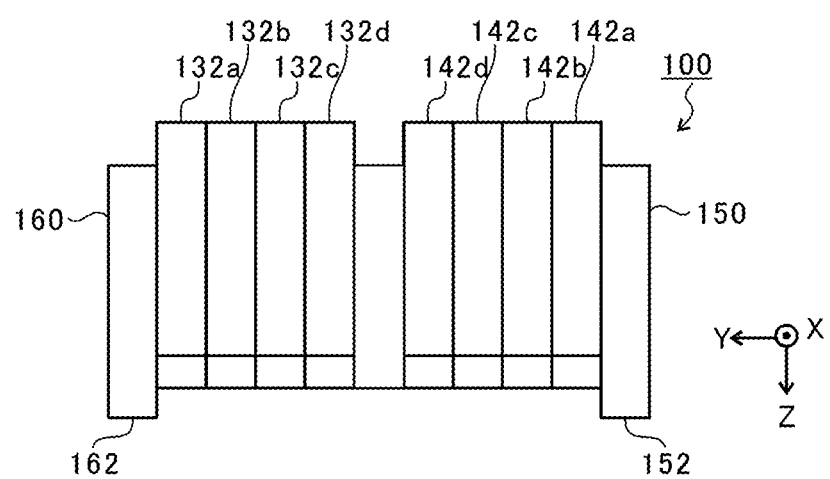
FIG. 1C is a second side view of the separation device according to the first embodiment.

FIG. 1A is a perspective view of a separation device 100 according to a first embodiment. FIG. 1B is a first side view of the separation device 100 according to the first embodiment. FIG. 1C is a second side view of the separation device 100 according to the first embodiment. In the following drawings including FIG. 1A to FIG. 1C of this embodiment, an X-axis, a Y-axis, and a Z-axis crossing each other perpendicularly are defined as illustrated.

The separation device 100 is a device configured to separate a raw material liquid into a distillate and a bottom product. The raw material liquid contains a low-boiling point component (for example, methanol) and a high-boiling point component (for example, water) having a boiling point higher than that of the low-boiling point component. The distillate is a liquid having a higher concentration of the low-boiling point component than the raw material liquid. The bottom product is a liquid having a higher concentration of the high-boiling point component than the raw material liquid.

The separation device 100 according to this embodiment is made of, for example, a metal material such as stainless steel. As illustrated in FIG. 1A to FIG. 1C, the separation device 100 includes a main body portion 110, a raw material liquid introduction portion 120, a first heat medium introduction portion 130, a first heat medium discharge portion 132, a second heat medium introduction portion 140, a second heat medium discharge portion 142, a distillate discharge portion 150, and a bottom product discharge portion 160.

The raw material liquid introduction portion 120 is configured to introduce the raw material liquid into the main body portion 110 (indicated by an outlined arrow in FIG. 1A). In this embodiment, the main body portion 110 is inclined vertically downward from one end side to another end side (from the distillate discharge portion 150 side to the bottom product discharge portion 160 side in FIG. 1A), for example, by about 2.5 degrees with respect to a horizontal plane. Thus, the raw material liquid introduced into the main body portion 110 flows from one end side to another end side. That is, the raw material liquid introduced into the main body portion 110 flows toward the bottom product discharge portion 160. The inclination angle of the main body portion 110 may be suitably changed depending on the properties of the raw material liquid.

The first heat medium introduction portion 130 is configured to introduce a heat medium having a boiling point equal to or higher than that of the low-boiling point component into flow passages of a stripping section of the main body portion 110 (indicated by black solid arrows in FIG. 1A). Then, the heat medium having passed through the flow passages of the stripping section is discharged to the outside through the first heat medium discharge portion 132. Thus, the first heat medium introduction portion 130, the first heat medium discharge portion 132, and the flow passages of the stripping section serve as the stripping section.

The second heat medium introduction portion 140 is configured to introduce a heat medium having a boiling point lower than that of the low-boiling point component into flow passages of a rectification section of the main body portion 110 (indicated by hatched arrows in FIG. 1A). Then, the heat medium having passed through the flow passages of the rectification section is discharged to the outside through the second heat medium discharge portion 142. Thus, the second heat medium introduction portion 140, the second heat medium discharge portion 142, and the flow passages of the rectification section serve as the rectification section.

The raw material liquid is distilled and separated into the distillate and the bottom product in the main body portion 110. The distillate separated in the main body portion 110 is discharged to the outside through a distillate discharge port 152 of the distillate discharge portion 150. Further, the bottom product separated in the main body portion 110 is discharged to the outside through a bottom product discharge port 162 of the bottom product discharge portion 160.

In this embodiment, the first heat medium introduction portion 130 is partitioned into first heat medium introduction portions 130a, 130b, 130c, and 130d in the stated order from the bottom product discharge portion 160 side. The first heat medium introduction portions 130a, 130b, 130c, and 130d are configured to increase the temperature of the heat medium introduced into the flow passages of the stripping section as approaching the bottom product discharge portion 160. Further, the second heat medium introduction portion 140 is partitioned into second heat medium introduction portions 140a, 140b, 140c, and 140d in the stated order from the distillate discharge portion 150 side. The second heat medium introduction portions 140a, 140b, 140c, and 140d are configured to decrease the temperature of the heat medium introduced into the flow passages of the rectification section as approaching the distillate discharge portion 150. With this, the separation efficiency between the distillate and the bottom product in the main body portion 110 can be improved.

Figure 2:
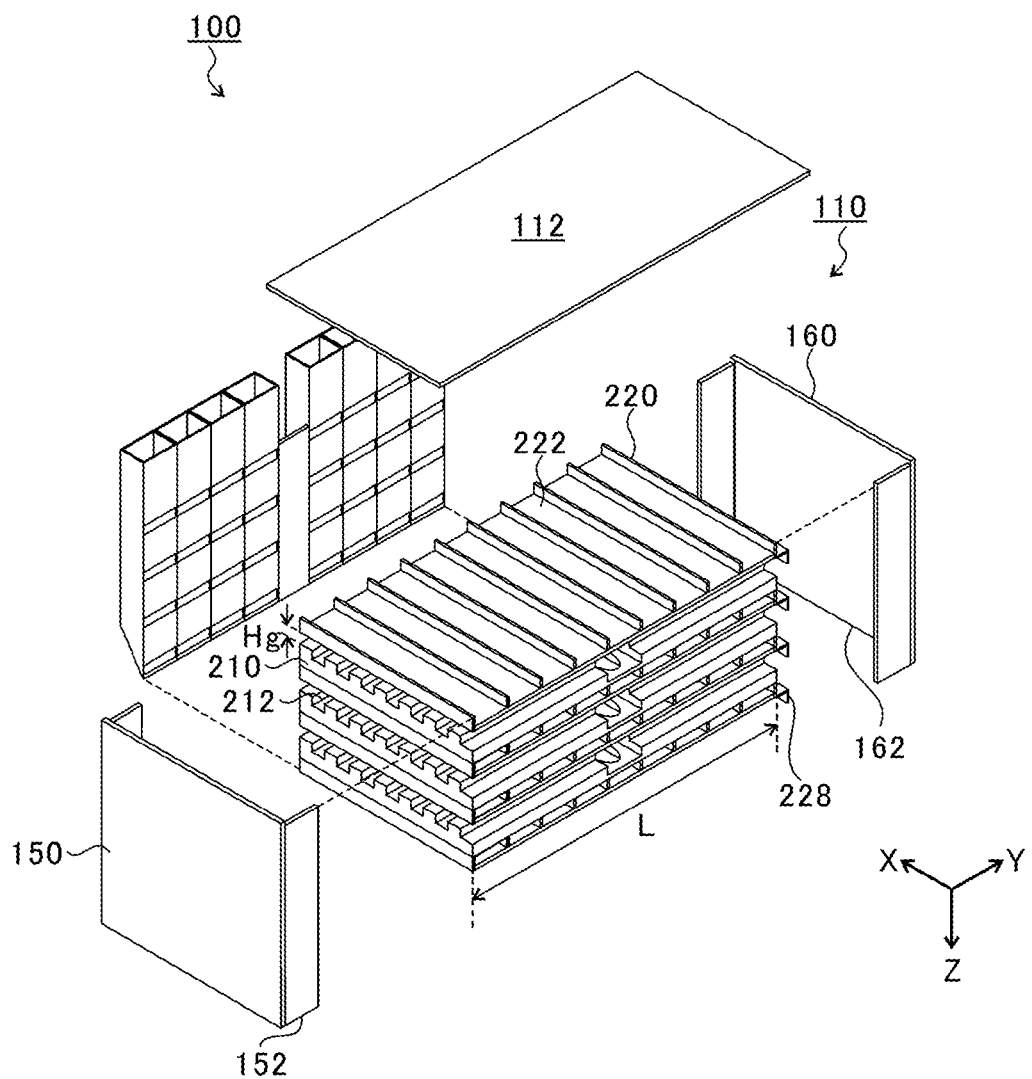
FIG. 2 is an exploded perspective view of the separation device.

Now, a specific configuration of the main body portion 110 is described. FIG. 2 is an exploded perspective view of the separation device 100. In FIG. 2, for ease of understanding, the first heat medium introduction portion 130, the second heat medium introduction portion 140, porous bodies, and angles 228 arranged on one end portion side of heat medium units 220 are omitted.

As illustrated in FIG. 2, the main body portion 110 has a structure in which a plurality of gas-liquid contact units 210 and a plurality of the heat medium units 220 are alternately arranged over one another at predefined intervals. Further, end portions in an X-axis direction of the gas-liquid contact units 210 in FIG. 2 are sealed with the first heat medium introduction portion 130, the first heat medium discharge portion 132, the second heat medium introduction portion 140, and the second heat medium discharge portion 142. Further, an upper surface of the heat medium unit 220 arranged at an uppermost level is sealed with a top surface 112. In this case, a space partitioned by the gas-liquid contact unit 210 and a bottom surface of the heat medium unit 220 forms gas-liquid contact flow passages 212. A space partitioned by the heat medium unit 220 and a bottom surface of the gas-liquid contact unit 210 forms heat medium flow passages 222.

In the separation device 100 according to this embodiment, the gas-liquid contact flow passages 212 are arranged in parallel to each other, and the heat medium flow passages 222 are arranged in parallel to each other. Further, the separation device 100 has a structure in which the gas-liquid contact flow passages 212 and the heat medium flow passages 222 are alternately arranged over one another. Further, in each of the gas-liquid contact flow passages 212, a porous body described later (not shown in FIG. 2) is arranged.

FIG. 3A is an explanatory view for illustrating the gas-liquid contact unit 210 and porous bodies 250. FIG. 3B is an explanatory view for illustrating the heat medium unit 220. As illustrated in FIG. 3A, the gas-liquid contact unit 210 has a raw material liquid introduction port 214 formed in the bottom surface thereof. The raw material liquid introduction port 214 is configured to receive the raw material liquid introduced from the raw material liquid introduction portion 120. Further, the gas-liquid contact unit 210 includes a plurality of ribs 216a and a plurality of ribs 216b. The ribs 216a extend from the raw material liquid introduction port 214 side to the bottom product discharge portion 160 side. The ribs 216b extend from the raw material liquid introduction port 214 side to the distillate discharge portion 150 side. Thus, a liquid such as the raw material liquid introduced from the raw material liquid introduction port 214 into the gas-liquid contact flow passages 212 flows through partitioned flow passages DR that are flow passages partitioned by the ribs 216a and 216b. That is, a liquid layer that is a layer of the liquid is formed in each of the partitioned flow passages DR. The ribs 216a and 216b are hereinafter sometimes collectively referred to as "ribs 216".

Further, the porous bodies 250 are arranged on upper surfaces of the ribs 216 of the gas-liquid contact unit 210. Alternatively, the porous bodies 250 are filled into part of the partitioned flow passages DR. Alternatively, the porous bodies 250 may be arranged on the upper surfaces of the ribs 216 of the gas-liquid contact unit 210 and further filled into part of the partitioned flow passages DR. When the porous bodies 250 are arranged on the upper surfaces of the ribs 216, bottom surfaces of the porous bodies 250 are held in contact with the upper surfaces of the ribs 216, and upper surfaces of the porous bodies 250 are held in contact with the bottom surface of the heat medium unit 220. That is, the porous bodies 250 are arranged between the gas-liquid contact unit 210 and the heat medium unit 220. Each of the gas-liquid contact flow passages 212 is formed of the partitioned flow passage DR (liquid layer) and a fine meandering flow passage (gas layer) in the porous body 250. When the porous bodies 250 are filled into the partitioned flow passages DR, the porous bodies 250 are filled into all the partitioned flow passages DR in the stripping section on the raw material liquid introduction port 214 side. The porous body 250 is described later in detail.

Further, as illustrated in FIG. 3B, the heat medium unit 220 includes a plurality of ribs 226 extending in a direction crossing (in this embodiment, a direction orthogonal to) the ribs 216. Of the flow passages partitioned by the ribs 226, a raw material flow passage MR is a flow passage formed at a position corresponding to the raw material liquid introduction port 214 when the heat medium unit 220 and the gas-liquid contact unit 210 are arranged over one another. The raw material liquid is introduced into the raw material flow passage MR from the raw material liquid introduction portion 120. Thus, the raw material liquid is introduced into the gas-liquid contact flow passages 212 through the raw material flow passage MR and the raw material liquid introduction port 214.

Further, a heat medium is introduced from the first heat medium introduction portion 130a into a flow passage Ra in the stripping section of the flow passages partitioned by the ribs 226. The heat medium having flowed through the flow passage Ra in the stripping section is discharged to a first heat medium discharge portion 132a. Similarly, a heat medium introduced from the first heat medium introduction portion 130b is discharged from a first heat medium discharge portion 132b after flowing through a flow passage Rb in the stripping section. A heat medium introduced from the first heat medium introduction portion 130c is discharged from a first heat medium discharge portion 132c after flowing through a flow passage Rc in the stripping section. A heat medium introduced from the first heat medium introduction portion 130d is discharged from a first heat medium discharge portion 132d after flowing through a flow passage Rd in the stripping section.

Further, a heat medium introduced from the second heat medium introduction portion 140a is discharged from a second heat medium discharge portion 142a after flowing through a flow passage Ca in the rectification section. Similarly, a heat medium introduced from the second heat medium introduction portion 140b is discharged from a second heat medium discharge portion 142b after flowing through a flow passage Cb in the rectification section. A heat medium introduced from the second heat medium introduction portion 140c is discharged from a second heat medium discharge portion 142c after flowing through a flow passage Cc in the rectification section. A heat medium introduced from the second heat medium discharge portion 140d is discharged from a second heat medium discharge portion 142d after flowing through a flow passage Cd in the rectification section.

Further, the angles 228 arranged so as to extend downward are provided at both end portions of the heat medium unit 220 in a direction orthogonal to the ribs 226 (extending direction of the partitioned flow passages DR). The angles 228 are configured to prevent leakage of a gas from the partitioned flow passages DR to the outside (to the distillate discharge port 152). Further, the angles 228 are configured to prevent the flow of the bottom product from the partitioned flow passages DR into the partitioned flow passages DR positioned in a lower stage of the partitioned flow passages DR.

Now, the dimensional relationship of the gas-liquid contact flow passage 212 is described. A width W of a bottom surface of the partitioned flow passage DR (distance between base ends of the ribs 216) is, for example, about 1 mm. A height HI of the partitioned flow passage DR (height of the rib 216) is, for example, about 3 mm. Further, a distance Hg between a distal end of the rib 216 and a bottom surface of the heat medium flow passage 222 illustrated in FIG. 2 is, for example, from about 100 μm to about 10 mm (in this case, 1 mm). Further, a length L in a flow direction of the gas-liquid contact flow passage 212 is, for example, 300 mm.

(Flows of Liquid and Gas in Gas-Liquid Contact Flow Passage 212)

Figure 4B:
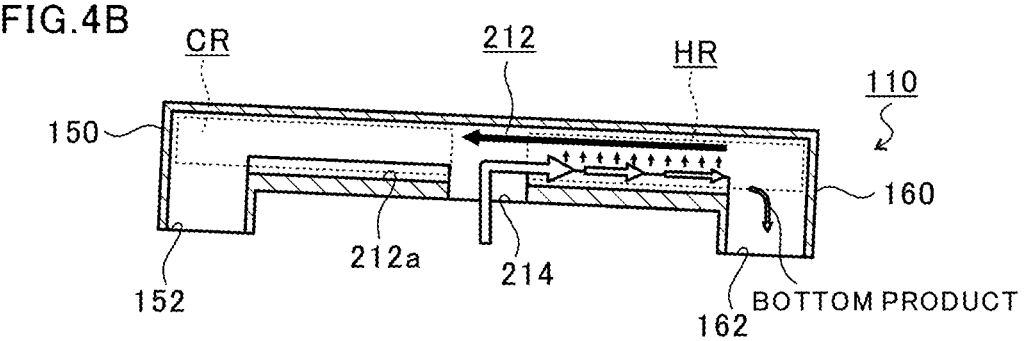
FIG. 4B is a second explanatory view for illustrating flows of the liquid and the gas in the gas-liquid contact flow passage.
Figure 4C:
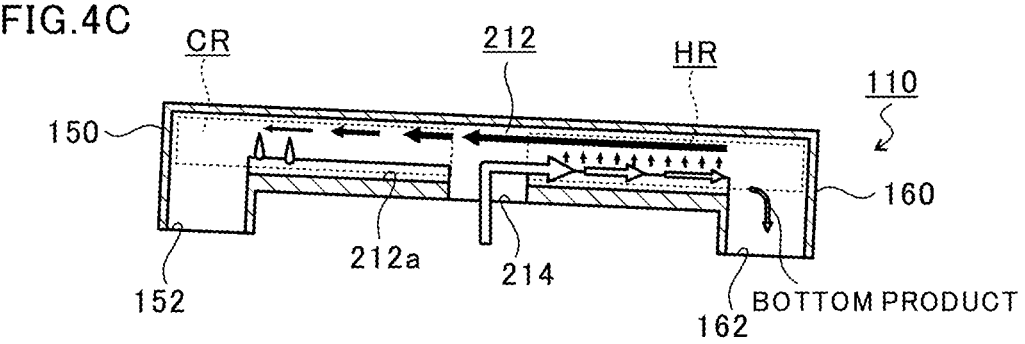
FIG. 4C is a third explanatory view for illustrating flows of the liquid and the gas in the gas-liquid contact flow passage.
Figure 4D:
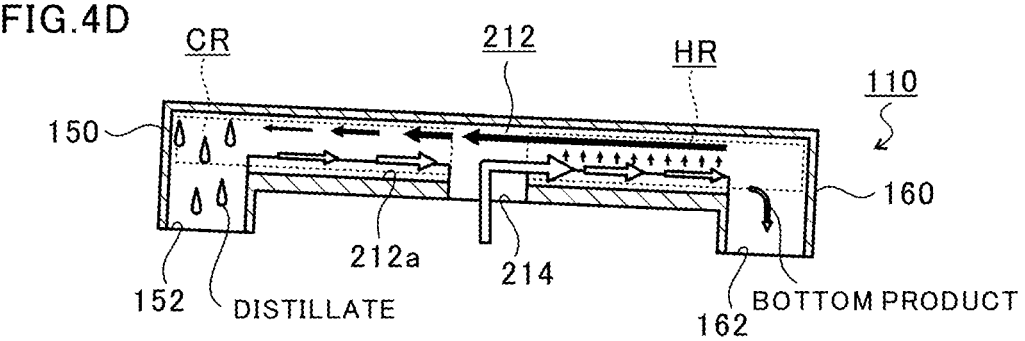
FIG. 4D is a fourth explanatory view for illustrating flows of the liquid and the gas in the gas-liquid contact flow passage.

Next, flows of a liquid and a gas in the gas-liquid contact flow passage 212 are described specifically. FIG. 4A is a first explanatory view for illustrating the flows of the liquid and the gas in the gas-liquid contact flow passage 212. FIG. 4B is a second explanatory view for illustrating the flows of the liquid and the gas in the gas-liquid contact flow passage 212. FIG. 4C is a third explanatory view for illustrating the flows of the liquid and the gas in the gas-liquid contact flow passage 212. FIG. 4D is a fourth explanatory view for illustrating the flows of the liquid and the gas in the gas-liquid contact flow passage 212. In FIG. 4A to FIG. 4D, the flow of the liquid is indicated by outlined arrows, and the flow of the gas is indicated by black solid arrows. In FIG. 4A to FIG. 4D, for ease of understanding, the heat medium flow passage 222 and the porous body 250 are omitted.

As described above, the main body portion 110 (bottom surface 212a of the gas-liquid contact flow passage 212) is inclined vertically downward from the distillate discharge portion 150 side to the bottom product discharge portion 160 side. Therefore, as illustrated in FIG. 4A, the raw material liquid introduced from the raw material liquid introduction port 214 flows through the gas-liquid contact flow passage 212 (partitioned flow passage DR) toward the bottom product discharge port 162 with its own weight.

Flow passages R in the stripping section are arranged over one another between the raw material liquid introduction port 214 and the bottom product discharge port 162. Therefore, the raw material liquid passes through a flow passage heated by the flow passages R in the stripping section (hereinafter simply referred to as "heating flow passage HR") of the gas-liquid contact flow passages 212 while flowing toward the bottom product discharge port 162. Then, as illustrated in FIG. 4B, the raw material liquid is heated to a temperature equal to or higher than the boiling point of the low-boiling point component when passing through the heating flow passage HR. With this, a gas containing the low-boiling point component in a large amount is generated from the raw material liquid.

As described above, when the raw material liquid is heated in the heating flow passage HR, a gas is generated from the raw material liquid. An entire region of the heating flow passage HR is heated by the flow passages R in the stripping section. Thus, in the heating flow passage HR, the generation amount of the gas increases as the raw material liquid approaches the bottom product discharge port 162. Therefore, in the heating flow passage HR, a pressure difference is caused between the raw material liquid introduction port 214 side and the bottom product discharge port 162 side. That is, in the heating flow passage HR, the pressure on the bottom product discharge port 162 side is higher than that on the raw material liquid introduction port 214 side. With this, the gas generated in the heating flow passage HR flows in a direction opposite to the flow of the liquid, that is, toward the raw material liquid introduction port 214 (distillate discharge port 152).

Flow passages C in the rectification section are arranged over one another between the raw material liquid introduction port 214 and the distillate discharge port 152. Therefore, the gas flowing from the heating flow passage HR to the distillate discharge port 152 passes through a flow passage cooled by the flow passages C in the rectification section (hereinafter simply referred to as "cooling flow passage CR") of the gas-liquid contact flow passages 212. Then, as illustrated in FIG. 4C, the gas is cooled to a temperature lower than the boiling point of the low-boiling point component when passing through the cooling flow passage CR. Thus, the low-boiling point component and the high-boiling point component are condensed into a liquid. The liquid generated in the cooling flow passage CR flows toward the heating flow passage HR. That is, in the separation device 100 according to this embodiment, the low-boiling point component and the high-boiling point component condensed by the flow passages C in the rectification section return to the heating flow passage HR. Therefore, reflux is performed, with the result that the separation performance for separation of the low-boiling point component and the high-boiling point component can be improved.

As illustrated in FIG. 4D, the liquid condensed in the distillate discharge portion 150, which is the gas having reached the distillate discharge portion 150, is discharged to the outside as a distillate through the distillate discharge port 152. Further, the liquid that has not been evaporated in the heating flow passage HR is discharged to the outside as a bottom product through the bottom product discharge port 162.

Figure 5A:
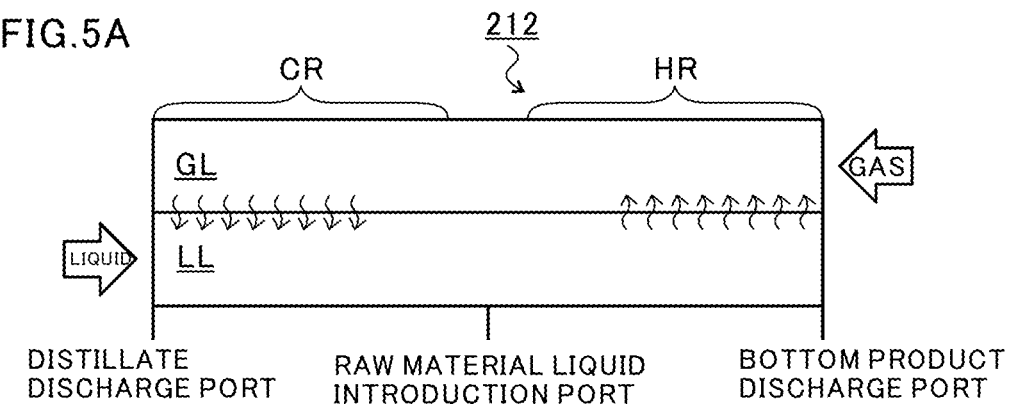
FIG. 5A is an explanatory view for illustrating a liquid layer and a gas layer in the gas-liquid contact flow passage.
Figure 5B:
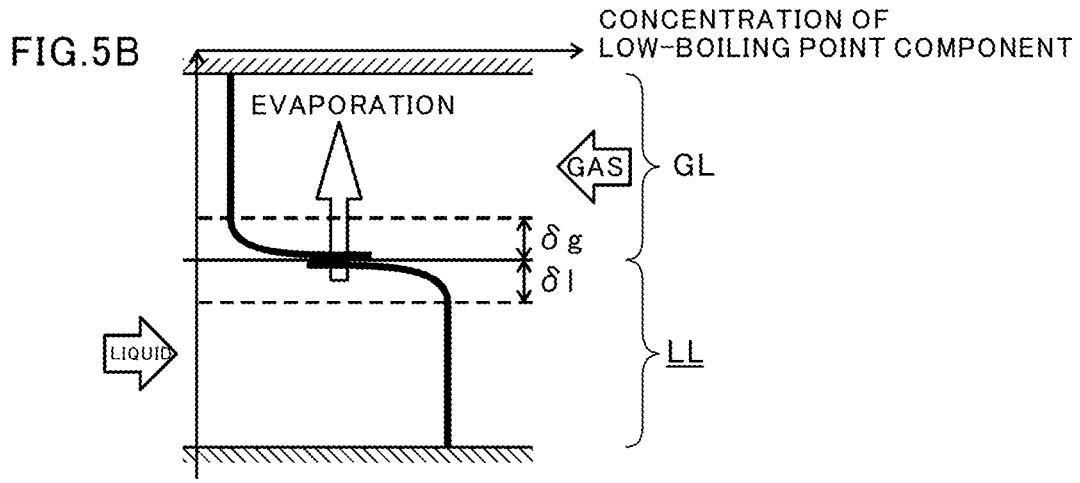
FIG. 5B is an explanatory view for illustrating a first representative example of a concentration distribution of a low-boiling point component in a heating flow passage.
Figure 5C:
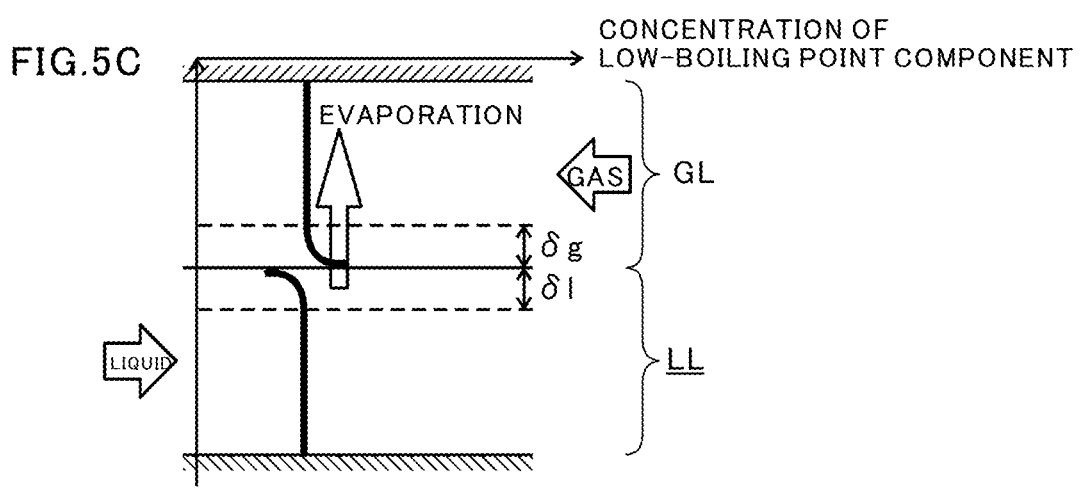
FIG. 5C is an explanatory view for illustrating a second representative example of the concentration distribution of the low-boiling point component in the heating flow passage.
Figure 6:
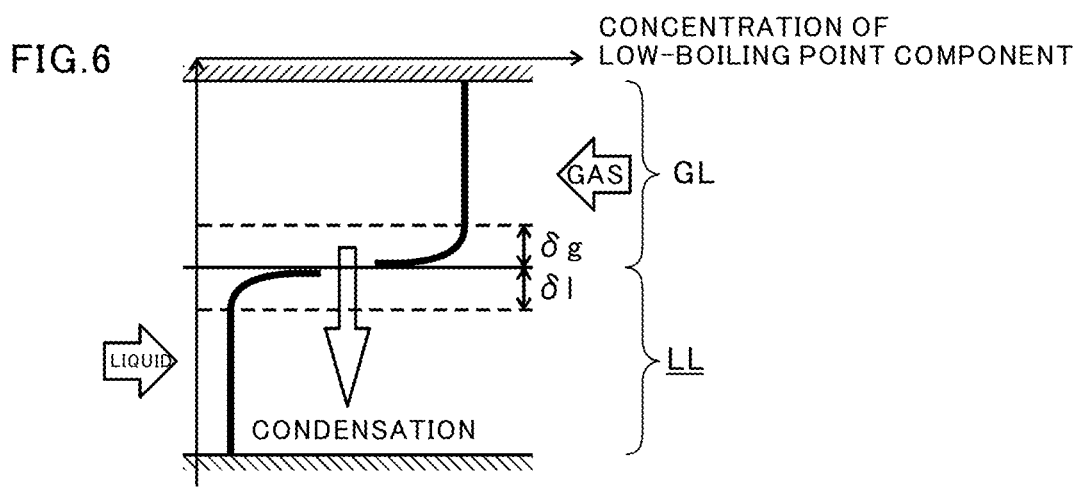
FIG. 6 is an explanatory view for illustrating a representative example of a concentration distribution of the low-boiling point component in a cooling flow passage.

Next, a liquid layer and a gas layer in the gas-liquid contact flow passage 212 are described. FIG. 5A is an explanatory view for illustrating a liquid layer and a gas layer in the gas-liquid contact flow passage 212. FIG. 5B is an explanatory view for illustrating a first representative example of a concentration distribution of the low-boiling point component in the heating flow passage. FIG. 5C is an explanatory view for illustrating a second representative example of the concentration distribution of the low-boiling point component in the heating flow passage. FIG. 6 is an explanatory view for illustrating a representative example of a concentration distribution of the low-boiling point component in the cooling flow passage. In FIG. 5A to FIG. 5C, and FIG. 6, for ease of understanding, the gas-liquid contact flow passage 212 is not inclined, and the distance in a height direction is equally illustrated between a layer of a liquid (liquid layer) and a layer of a gas (gas layer).

As illustrated in FIG. 5A, a liquid layer LL and a gas layer GL are formed in the gas-liquid contact flow passage 212. The liquid layer LL is a layer in which a liquid flows from the distillate discharge port 152 side to the bottom product discharge port 162 side. The gas layer GL is a layer in which a gas flows from the bottom product discharge port 162 side to the distillate discharge port 152 side above the liquid layer LL. Gas-liquid contact occurs at the boundary of the liquid layer LL and the gas layer GL, and the gas-liquid contact flow passage 212 is brought into a gas-liquid equilibrium state.

As described above, in this embodiment, the height of the gas-liquid contact flow passage 212 is as small as about 4 mm. Therefore, the height of each of the liquid layer LL and the gas layer GL is also as small as 4 mm or less. Now, with reference to FIG. 5B, FIG. 5C, and FIG. 6, description is given of a relationship between the height of the gas layer GL and the speed at which a gas-liquid equilibrium is achieved. As illustrated in FIG. 5B and FIG. 5C, the low-boiling point component is evaporated from the liquid layer LL in the heating flow passage HR (on the flow passage R side in the stripping section). Therefore, in the liquid layer LL, the concentration of the low-boiling point component is low in a boundary layer 61 in the vicinity of a liquid surface with respect to the gas layer GL, and the concentration of the low-boiling point component increases as a distance from the gas layer GL increases. Thus, in the liquid layer LL, the low-boiling point component is diffused in a direction from a wall surface (bottom surface) to the gas layer GL. In this case, as the height of the liquid layer LL becomes smaller, the concentration gradient of the low-boiling point component increases. Therefore, a mass transfer rate increases to accelerate evaporation. Meanwhile, as illustrated in FIG. 6, in the cooling flow passage CR (on the flow passage C side in the rectification section), when vapor is cooled, the low-boiling point component is condensed from the gas layer GL. Therefore, in the gas layer GL, the concentration of the low-boiling point component is low in a boundary layer δg in the vicinity of the liquid surface with respect to the liquid layer LL, and the concentration of the low-boiling point component increases as a distance from the liquid layer LL increases. Thus, in the gas layer GL, the low-boiling point component is diffused in a direction from a wall surface (upper surface) to the liquid layer LL. Also in this case, as the height of the gas layer GL becomes smaller, the concentration gradient of the low-boiling point component increases. Therefore, a mass transfer rate increases to accelerate condensation.

Specifically, as the height of each of the gas layer GL and the liquid layer LL becomes smaller, a time period required for mass transfer is shortened. Hence, a time period required for a gas-liquid equilibrium to be achieved is also shortened. That is, the speed at which a gas-liquid equilibrium is achieved increases as the height of each of the gas layer GL and the liquid layer LL becomes smaller. Therefore, when the height of each of the gas layer GL and the liquid layer LL is reduced (for example, to 10 mm or less), a time period required for a gas-liquid equilibrium to be achieved can be significantly shortened as compared to the related-art plate column.

However, there is a limit to the height of the gas layer GL. In view of this, in the separation device 100 according to this embodiment, the porous body 250 is arranged in the gas layer GL, to thereby cause the flow of a gas flowing through the gas layer GL to meander. That is, the distance by which a gas flows in the gas-liquid contact flow passage 212 is set to be longer than a shortest distance between the distillate discharge portion 150 and the bottom product discharge portion 160.

Meanwhile, the amount of vapor and the volume of the gas layer GL remain unchanged, and hence a retention time does not change. That is, the flow speed of the gas flowing through the porous body 250 temporarily increases while the gas meanders. With this, the thickness of the boundary layer δg becomes thinner. That is, it is conceivable that the mass transfer rate increases to further shorten a time period required for a gas-liquid equilibrium to be achieved. Thus, the separation performance for separation of the low-boiling point component and the high-boiling point component can be improved.

Further, when the porous bodies 250 are filled into the partitioned flow passages DR, there is such an effect that the raw material liquid easily flows into all the partitioned flow passages DR. The partitioned flow passages DR are each arranged so as to make a downward slope, and hence the raw material liquid flows into the partitioned flow passages DR. However, there may occur a situation in which the raw material liquid flows into part of the flow passages without flowing into all the partitioned flow passages DR due to resistance such as surface tension applied to the raw material liquid and the flow passages. In view of this, the inflow of the raw material liquid is accelerated by the porous bodies 250 filled into the partitioned flow passages DR. Meanwhile, when the porous bodies 250 are filled with a liquid to be saturated, large resistance is caused, with the result that the raw material liquid flows into the flow passages into which the raw material liquid has not flowed. Through repetition of this phenomenon, the raw material liquid finally flows into all the partitioned flow passages DR. With this, a retention time of the flow of the raw material liquid is increased, and the raw material liquid is sufficiently heated, thereby evaporating the substantially entire low-boiling point component. Thus, the separation performance for separation of the low-boiling point component and the high-boiling point component is improved, and in particular, the recovery rate can be significantly improved.

There is no limitation on a material for the porous body 250, but it is preferred that the material have large heat conductivity and corrosion resistance against components contained in the raw material liquid. It is preferred that the porous body 250 be made of, for example, a metal (for example, stainless steel or titanium), a synthetic resin, plastic (for example, a fluororesin), glass, or ceramics. The porous body 250 may also be made of sponge.

Further, it is preferred that the flow passage sectional area of the meandering flow passage formed in the porous body 250 be large to such a degree that the porous body does not suck the liquid in the liquid layer LL through a capillary phenomenon. That is, the flow passage sectional area (pore diameter) of the porous body 250 is designed based on the components of the raw material liquid. With this, the situation in which a pressure loss in the gas layer GL increases can be avoided.

As descried above, in the separation device 100 according to this embodiment, through arrangement of the porous body 250 in the gas layer GL, the mass transfer rate of a gas is increased to improve the separation performance for separation of the low-boiling point component and the high-boiling point component, and the processing amount can be increased. Further, the separation device 100 has a structure in which the plurality of gas-liquid contact units 210 and the plurality of heat medium units 220 are alternately arranged over one another, and hence the processing amount of the raw material liquid can be increased.

Second Embodiment

Figure 7A:
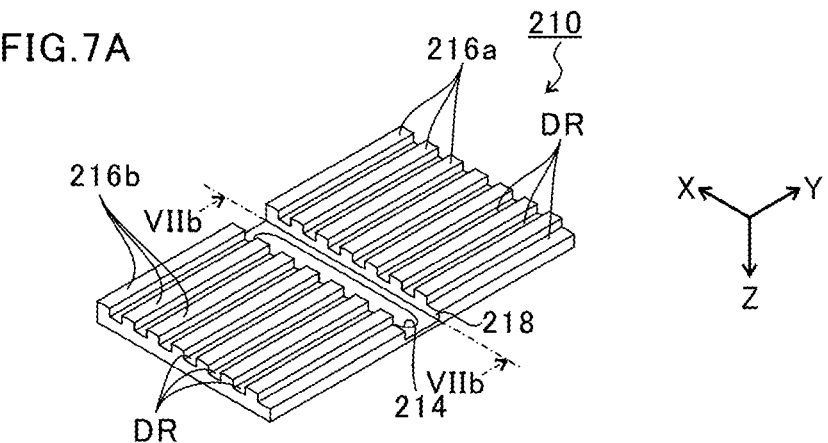
FIG. 7A is an explanatory view for illustrating the gas-liquid contact unit in the first embodiment.
Figure 7B:
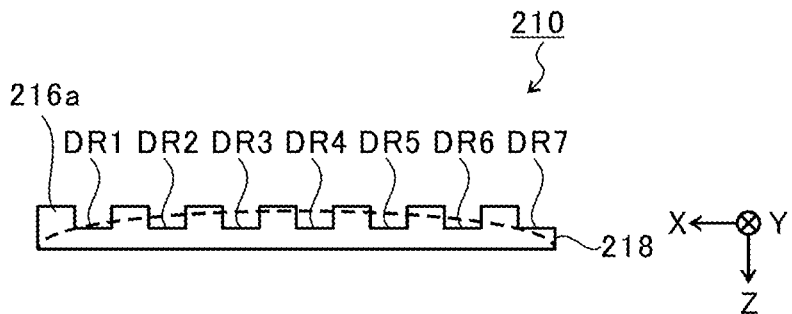
FIG. 7B is a sectional view as seen in the direction indicated by the arrows VIIb of FIG. 7A.
Figure 8A:
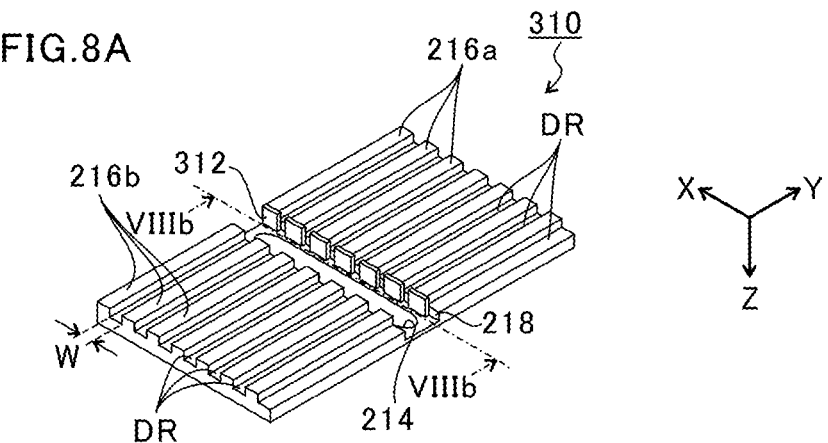
FIG. 8A is an explanatory view for illustrating a gas-liquid contact unit in a second embodiment.
Figure 8B:
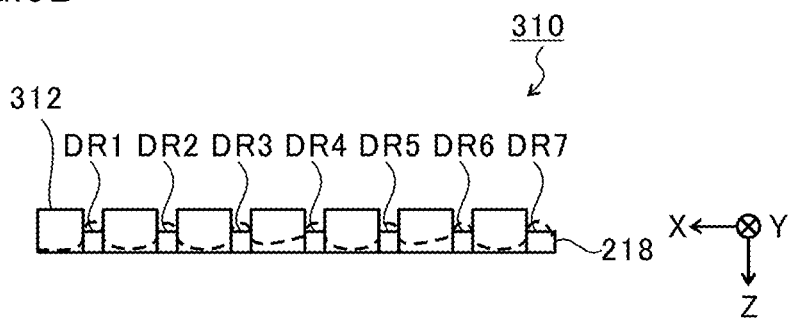
FIG. 8B is a sectional view as seen in the direction indicated by the arrows VIIIb of FIG. 8A.

FIG. 7A is an explanatory view for illustrating the gas-liquid contact unit 210 in the first embodiment. FIG. 7B is a sectional view as seen in the direction indicated by the arrows VIIb of FIG. 7A. FIG. 8A is an explanatory view for illustrating a gas-liquid contact unit 310 in a second embodiment. FIG. 8B is a sectional view as seen in the direction indicated by the arrows VIIIb of FIG. 8A. FIG. 8C is a partial top view of FIG. 8A. FIG. 9 is a partial top view of a gas-liquid contact unit 350.

As illustrated in FIG. 7A and FIG. 7B, the gas-liquid contact unit 210 in the first embodiment includes a raised portion 218 between the bottom surfaces of the ribs 216*a* and the raw material liquid introduction port 214. Thus, when a raw material liquid is introduced from the raw material liquid introduction port 214, the raw material liquid reaches the partitioned flow passages DR through (over) the raised portion 218. In this case, as illustrated in FIG. 7B, surface tension is applied to the raw material liquid (indicated by the broken line in FIG. 7B), and a difference in amount is caused in the raw material liquid to be introduced between a partitioned flow passage DR4 arranged at the center and other partitioned flow passages DR1 to DR3 and DR5 to DR7. Specifically, the introduction amount of the raw material liquid decreases from the center to the partitioned flow passages DR1 and DR7 arranged at both ends.

In view of the foregoing, as illustrated in FIG. 8A to FIG. 8C, baffle plates 312 are arranged on the ribs 216*a* on the raw material liquid introduction port 214 side. The baffle plates 312 are arranged so as to extend upright from a bottom surface of the gas-liquid contact unit 310 (base end portion of the raised portion 218). With this, the raw material liquid introduced from the raw material liquid introduction port 214 is introduced into the partitioned flow passages DR through flow passages between the baffle plates 312. That is, the raw material liquid is introduced into the partitioned flow passages DR after being distributed to the flow passages between the baffle plates 312. With this, the difference in introduction amount of the raw material liquid among the partitioned flow passages DR1 to DR7 can be reduced, and variations in separation performance in the respective partitioned flow passages DR can be reduced.

Further, as illustrated in FIG. 8B and FIG. 8C, in the second embodiment, the baffle plates 312 are designed so that a distance Wa between the baffle plates 312 is smaller than the width W of the partitioned flow passage DR. Therefore, the raw material liquid is guided from the narrow flow passages to the wide partitioned flow passages DR. Thus, when the raw material liquid is introduced into the partitioned flow passages DR, the flow speed of the raw material liquid is decreased, and the difference in introduction amount of the raw material liquid among the partitioned flow passages DR1 to DR7 can be further reduced.

Further, the gas-liquid contact unit 350 illustrated in FIG. 9 may be used. In the gas-liquid contact unit 350, ribs 316*a* are formed so that a width Wb of an end portion of the partitioned flow passage DR on the raw material liquid introduction port 214 side is larger than that on the bottom product discharge portion 160 side. With this, a reception port for the raw material liquid of each of the partitioned flow passages DR can be widened, and the difference in introduction amount of the raw material liquid among the partitioned flow passages DR1 to DR7 can be reduced.

Third Embodiment

In the first embodiment, description is given by exemplifying the configuration in which the porous body 250 is arranged in the gas layer GL to prolong the retention time of a gas flowing through the gas layer GL. In a third embodiment, the retention time of a liquid is prolonged by devising the shape of the partitioned flow passage forming the liquid layer LL.

Figure 10A:
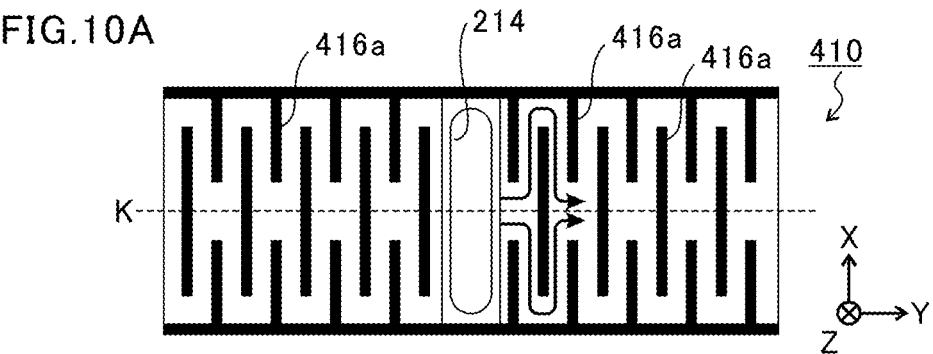
FIG. 10A is a first top view of a gas-liquid contact unit in a third embodiment.
Figure 10B:
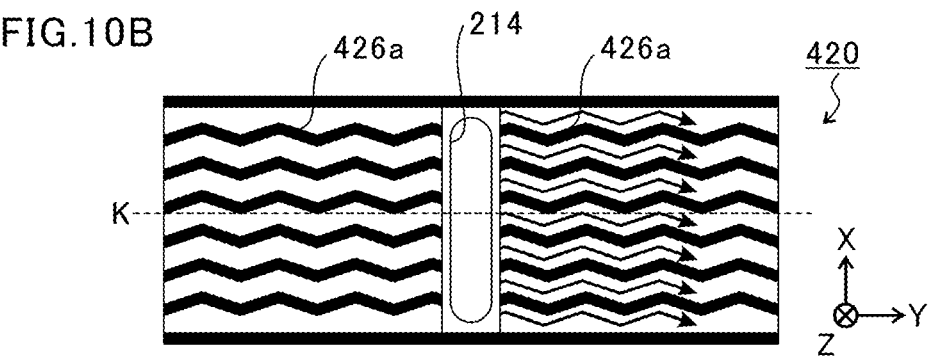
FIG. 10B is a second top view of the gas-liquid contact unit in the third embodiment.
Figure 10C:
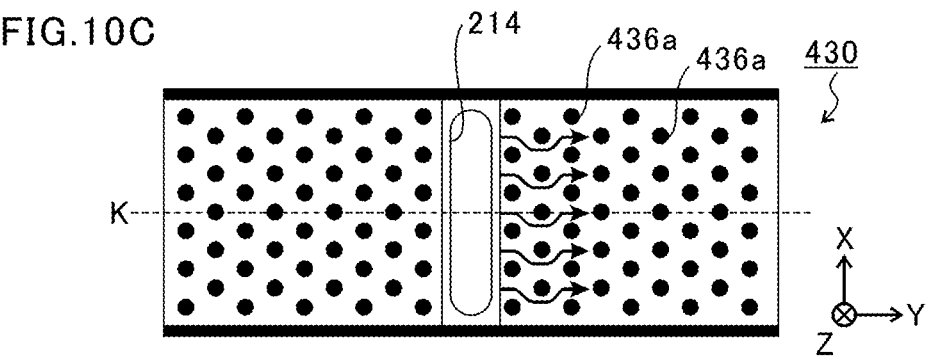
FIG. 10C is a third top view of the gas-liquid contact unit in the third embodiment.

FIG. 10A is a first top view of a gas-liquid contact unit 410 in the third embodiment. FIG. 10B is a second top view of a gas-liquid contact unit 420 in the third embodiment. FIG. 10C is a third top view of a gas-liquid contact unit 430 in the third embodiment. In FIG. 10A to FIG. 10C, for ease of understanding, the ribs are illustrated by black solid parts.

For example, the gas-liquid contact unit 410 illustrated in FIG. 10A includes a plurality of ribs 416*a*. The ribs 416*a* extend in a direction orthogonal to an imaginary straight line K (flow direction of the raw material liquid when the ribs 416*a* are not formed) that connects the distillate discharge port 152 and the bottom product discharge port 162 to each other. That is, the gas-liquid contact unit 410 includes the ribs 416*a* arranged in a so-called labyrinth structure. Further, the gas-liquid contact unit 420 illustrated in FIG. 10B includes a plurality of ribs 426*a*. The ribs 426*a* extend in a direction crossing the imaginary straight line K. Further, the gas-liquid contact unit 430 illustrated in FIG. 10C has a structure in which a plurality of columnar bar members 436*a* are arranged so as to extend upright from a bottom surface.

In the gas-liquid contact unit 410 to the gas-liquid contact unit 430, the flow of a liquid flowing through the liquid layer LL can be caused to meander. That is, a meandering flow passage can be formed. In the meandering flow passage, the distance by which a liquid flows in the gas-liquid contact flow passage 212 is larger than a shortest distance from the distillate discharge portion 150 to the bottom product discharge portion 160.

With this, the retention time of a liquid in the liquid layer LL can be prolonged. Thus, the separation performance for separation of the low-boiling point component and the high-boiling point component can be improved.

The configuration in which the porous body 250 is arranged in the liquid layer LL is conceivable. However, the viscosity of a liquid is higher than that of a gas. Therefore, when the porous body 250 is arranged in the liquid layer LL, a pressure loss is increased, and the processing speed is decreased. Thus, with the configuration as illustrated in the gas-liquid contact unit 410 to the gas-liquid contact unit 430, the separation performance for separation of the low-boiling point component and the high-boiling point component can be improved while a decrease in processing speed is prevented.

Fourth Embodiment

The gas-liquid contact unit 210 in the first embodiment is formed by performing groove processing. However, the plurality of partitioned flow passages DR can also be formed in the gas-liquid contact unit with another configuration.

Figure 11A:
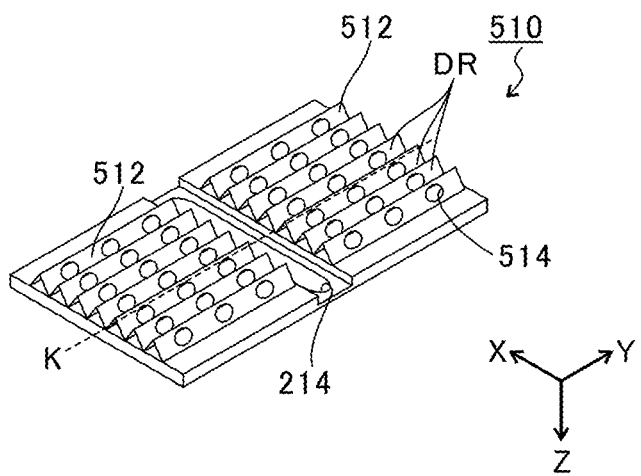
FIG. 11A is a first explanatory view for illustrating a gas-liquid contact unit in a fourth embodiment.
Figure 11B:
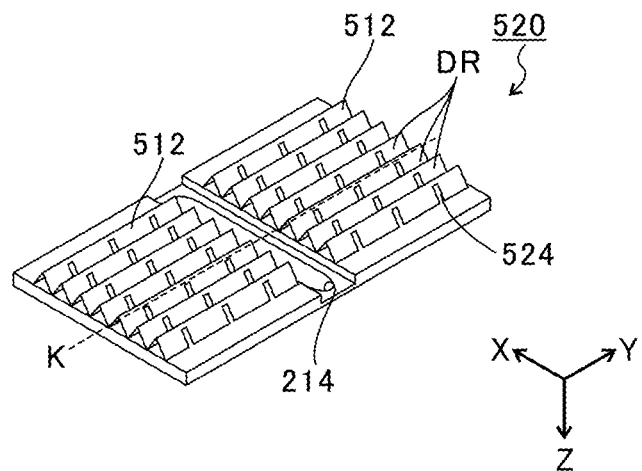
FIG. 11B is a second explanatory view for illustrating the gas-liquid contact unit in the fourth embodiment.
Figure 11C:
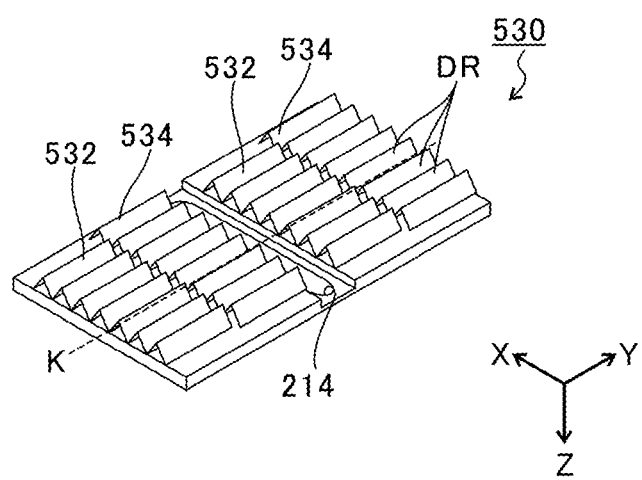
FIG. 11C is a third explanatory view for illustrating the gas-liquid contact unit in the fourth embodiment.

FIG. 11A is a first explanatory view for illustrating a gas-liquid contact unit 510 in a fourth embodiment. FIG. 11B is a second explanatory view for illustrating a gas-liquid contact unit 520 in the fourth embodiment. FIG. 11C is a third explanatory view for illustrating a gas-liquid contact unit 530 in the fourth embodiment. As illustrated in FIG. 11A, the ribs 216 may be replaced by plate-shaped members 512 that are raised and recessed, that is, plate members each having a corrugated plate shape (corrugated shape). With this, the gas-liquid contact flow passage 212 is partitioned into the plurality of partitioned flow passages DR by the members 512. The plurality of partitioned flow passages DR are arranged in parallel in a direction orthogonal to the imaginary straight line K (X-axis direction in FIG. 11A). Further, through holes 514 are formed in the members 512. Thus, a liquid flowing below the members 512 can be moved above the members 512. Further, a liquid flowing above the members 512 can be moved below the members 512. Thus, the diffusion of the liquid can be accelerated. Further, as illustrated in FIG. 11B, the gas-liquid contact unit 520 including the members 512 having cutout portions 524 formed therein may be used.

Further, as illustrated in FIG. 11C, the gas-liquid contact unit 530, in which first members 532 and second members 534 are arranged at a predetermined interval in a Y-axis direction in FIG. 11C, may be used. The first members 532 and the second members 534 are plate-shaped members that are raised and recessed. The first members 532 and the second members 534 are arranged so that the raised portions of the first members 532 and the recessed portions of the second members 534 overlap with one another on the imaginary straight line K (Y-axis direction in FIG. 11C).

As described above, when the members 512, 532, and 534 each having a corrugated plate shape are arranged in place of the ribs 216, the manufacturing cost of the gas-liquid contact units 510, 520, and 530 can be reduced.

Fifth Embodiment

In the first embodiment, description is given of the separation device 100 in which the distillate discharge portion 150 and the bottom product discharge portion 160 are connected to the main body portion 110. However, the length L of the main body portion 110 is not sufficient in some cases depending on components contained in a raw material liquid. Further, when the raw material liquid contains three or more kinds of components, there is also a demand for separating the raw material liquid into respective components. In view of the foregoing, in a fifth embodiment, description is given of a separation device in which the raw material liquid can be efficiently separated irrespective of the components of the raw material liquid by modularizing the main body portion 110, the distillate discharge portion 150, and the bottom product discharge portion 160.

Figure 12A:
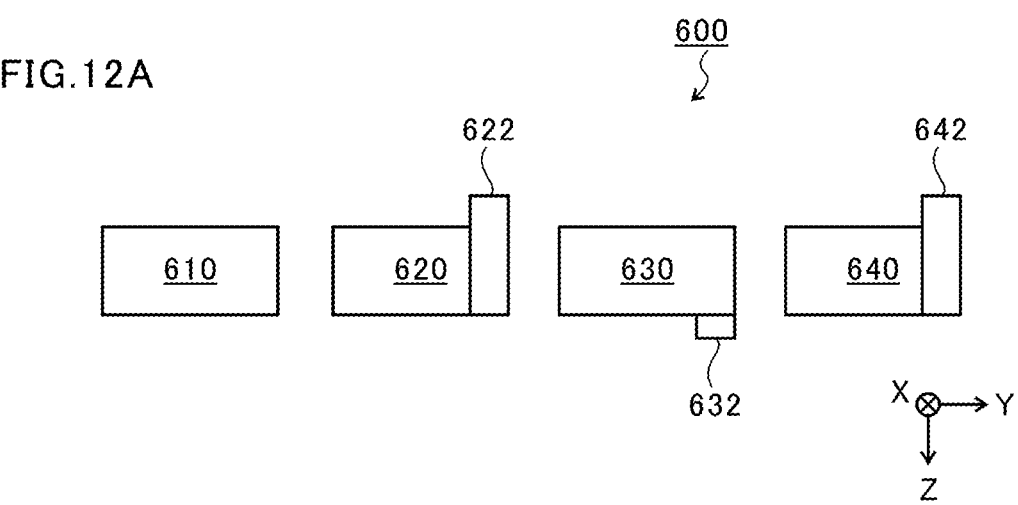
FIG. 12A is a first view for illustrating each module forming a separation device according to a fifth embodiment.
Figure 12B:
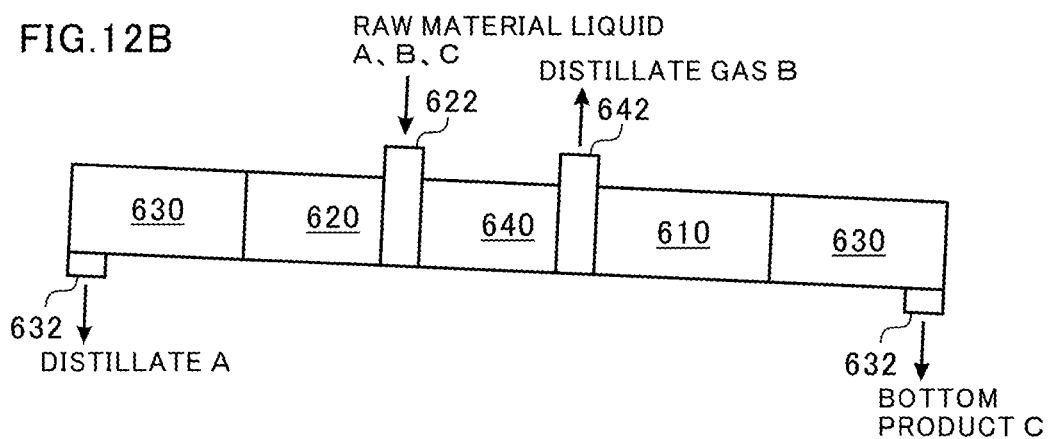
FIG. 12B is a second view for illustrating each module forming the separation device according to the fifth embodiment.

FIG. 12A is a first view for illustrating each module forming the separation device according to the fifth embodiment. FIG. 12B is a second view for illustrating each module forming the separation device according to the fifth embodiment. In FIG. 12A and FIG. 12B, for ease of understanding, the first heat medium introduction portion 130, the first heat medium discharge portion 132, the second heat medium introduction portion 140, and the second heat medium discharge portion 142 are omitted.

As illustrated in FIG. 12A, a separation device 600 according to the fifth embodiment includes a flow passage module 610, an introduction module 620, a first discharge module 630, and a second discharge module 640. The flow passage module 610 is a module in which the gas-liquid contact flow passages 212 and the heat medium flow passages 222 are arranged over one another. The introduction module 620 is a module in which the gas-liquid contact flow passages 212 and the heat medium flow passages 222 are arranged over one another. Further, a raw material liquid introduction portion 622 configured to introduce a raw material liquid into the gas-liquid contact flow passages 212 is provided to the introduction module 620. The first discharge module 630 is a module in which the gas-liquid contact flow passages 212 and the heat medium flow passages 222 are arranged over one another. A liquid discharge portion 632 configured to discharge a liquid from the gas-liquid contact flow passages 212 is provided to the first discharge module 630. The second discharge module 640 is a module in which the gas-liquid contact flow passages 212 and the heat medium flow passages 222 are arranged over one another. A gas discharge portion 642 configured to discharge a gas from the gas-liquid contact flow passages 212 is provided to the second discharge module 640.

Various raw material liquids can be separated by combining the flow passage module 610, the introduction module 620, the first discharge module 630, and the second discharge module 640 to form the separation device.

For example, when the raw material liquid contains a component A, a component B, and a component C, and an attempt is made to separate those three components A, B, and C from the raw material liquid, it is only required that the modules 610 to 640 be combined as illustrated in FIG. 12B. With this, the raw material liquid (containing the component A, the component B, and the component C) is introduced from the raw material liquid introduction portion of the introduction module 620, and the raw material liquid moves to the second discharge module 640, the flow passage module 610, and the first discharge module 630. During this time, the components A and B are evaporated. The component C which remained is discharged as a bottom product from the liquid discharge portion 632 of the first discharge module 630 provided at a right end in FIG. 12B. Meanwhile, the components A and B which are evaporated move to a left side in FIG. 12B, and the component B is discharged as a distillate gas from the gas discharge portion 642 of the second discharge module 640. The component A is condensed while passing through the introduction module 620 and the first discharge module 630, and is discharged as a distillate from the liquid discharge portion 632 of the first discharge module 630 provided at a left end.

Further, when components C and D contained in the raw material liquid are separated therefrom, the number of the flow passage modules 610 can also be set based on the difference in boiling point between the components C and D. For example, when the difference in boiling point between the components C and D is large, the number of the flow passage modules 610 is small. When the difference in boiling point between the components C and D is small, the number of the flow passage modules 610 is large.

Examples

As Example 1, distillation was performed through use of the separation device 100 having the porous bodies 250 arranged on upper surfaces (gas layers) of the ribs 216. As Example 2, distillation was performed through use of the separation device 100 having the porous bodies 250 filled into part of the partitioned flow passages DR. As Comparative Example, distillation was performed through use of a separation device having no meandering flow passage forming portions (porous bodies). A mixed solution of methanol and water was used as a raw material liquid.

Figure 13A:
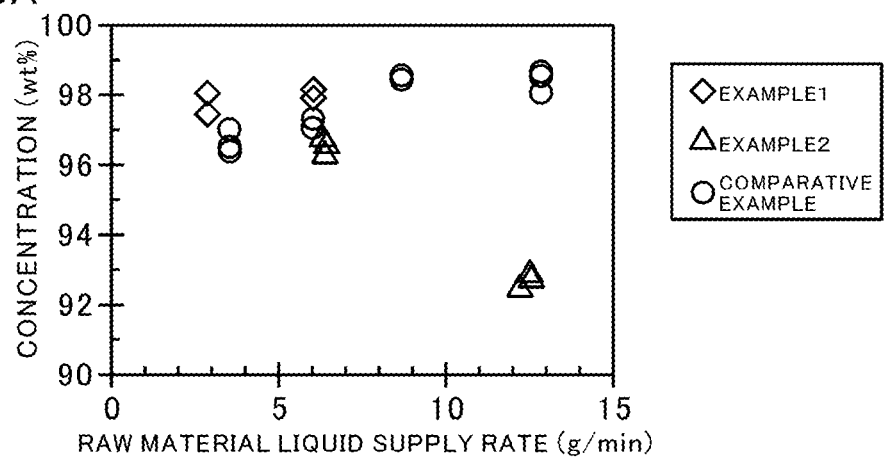
FIG. 13A is a graph for showing a concentration (% by weight (wt %)) of methanol in a distillate in Examples and Comparative Example.
Figure 13B:
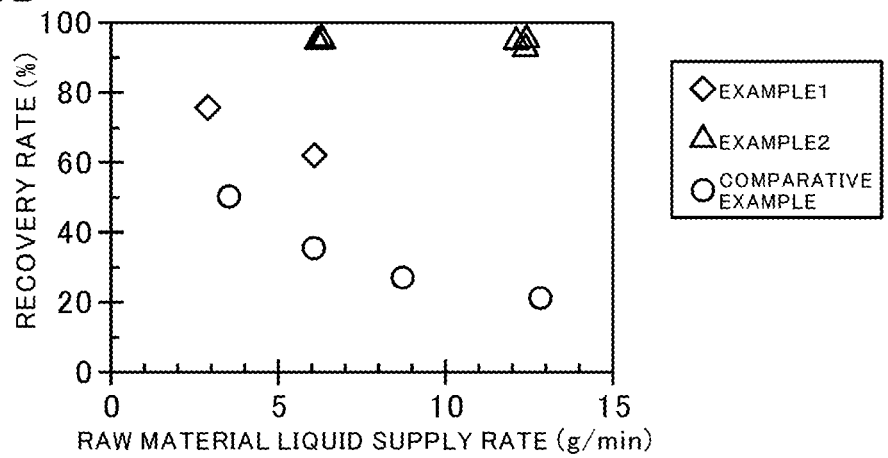
FIG. 13B is a graph for showing a methanol recovery rate (%) in Examples and Comparative Example.

FIG. 13A is a graph for showing a concentration (% by weight (wt %)) of methanol in a distillate in Examples and Comparative Example. FIG. 13B is a graph for showing a methanol recovery rate (%) in Examples and Comparative Example. In FIG. 13A and FIG. 13B, Example 1 is indicated by rhombic marks, Example 2 is indicated by triangular marks, and Comparative Example is indicated by circular marks.

The recovery rate of methanol was calculated through use of the following expression (1).

$$\text{Recovery rate of methanol} = 100 \times D \times X_D / (F \times X_F) \qquad (1)$$

where F represents a supply flow rate (g/min) of the raw material liquid, D represents a discharge flow rate (g/min) of a distillate, $X_F$ represents a concentration of methanol in the raw material liquid, and $X_D$ represents a concentration of methanol in the distillate.

As shown in FIG. 13A, it was found that the concentration of methanol in the distillate in Example 1 was higher than that in Comparative Example. Further, it was found that, when the supply flow rate of the raw material liquid was 7 g/min or less, the concentration of methanol in the distillate in Example 2 was similar to that in Comparative Example. Further, as shown in FIG. 13B, it was found that the recovery rates of methanol in Examples 1 and 2 were higher than that in Comparative Example.

Thus, it was confirmed that the separation performance (concentration of the low-boiling point component in the distillate) can be improved with a configuration in which the separation device 100 includes the meandering flow passage forming portions (porous bodies). Further, it is considered that the separation performance was improved because the condensation amount of vapor generated in the heating flow passage HR was increased due to an increase in mass transfer rate caused by meandering of a fluid in the meandering flow passage forming portions. Further, it is considered that the separation performance was improved because the retention time of the raw material liquid in the stripping section was prolonged by virtue of the uniform inflow of the raw material liquid into the partitioned flow passages DR so that the entire low-boiling point component was able to be evaporated.

The preferred embodiments of the present disclosure have been described above with reference to the attached drawings, but, needless to say, the present disclosure is not limited to the embodiments. It is apparent that those skilled in the art may arrive at various alternations and modifications within the scope of claims, and those examples are construed as naturally falling within the technical scope of the present disclosure.

For example, in the above-mentioned embodiments, description is given of the configuration in which the bottom surface 212a of each of the gas-liquid contact flow passages 212 is inclined vertically downward from the distillate discharge port 152 to the bottom product discharge port 162. However, the bottom surface 212a of the gas-liquid contact flow passage 212 may extend in a horizontal direction.

Further, in the above-mentioned embodiments, description is given by exemplifying the configuration in which the porous body 250 is arranged over an entire region in the length L direction of each of the gas-liquid contact flow passages 212. However, the porous body 250 may be arranged intermittently in the length L direction of the gas-liquid contact flow passage 212.

Further, in the above-mentioned embodiments, description is given by exemplifying the configuration in which the inner flow passage sectional area (sum of sectional areas of the pores) of the porous body 250 is uniform over the entire region in the length L direction of the gas-liquid contact flow passage 212. However, the sum of the sectional areas of the pores may be set to be different between the distillate discharge port 152 side and the bottom product discharge port 162 side. For example, the sum of the sectional areas of the pores on the bottom product discharge port 162 side may be set to be larger than that on the distillate discharge port 152 side. That is, the sum of the sectional areas of the pores in the heating flow passage HR may be set to be larger than that in the cooling flow passage CR. With this, the flow passage sectional area is increased, with the result that a pressure loss of a gas can be reduced on the bottom product discharge port 162 side on which the amount of the gas is large.

Further, in the above-mentioned embodiments, description is given by exemplifying the configuration in which the porous body 250 is arranged in the gas layer GL as the meandering flow passage forming portion that forms a meandering flow passage configured to cause the flow of a gas flowing through the gas layer GL to meander. However, there is no limitation on the configuration of the meandering flow passage forming portion as long as the meandering flow passage forming portion can form a meandering flow passage configured to cause the flow of the gas flowing through the gas layer GL to meander. For example, the meandering flow passage forming portion may be formed of one or more baffles extending in a direction crossing the flow direction of the gas.

Further, in the above-mentioned embodiments, the dimensional relationship and the inclination angle of the gas-liquid contact flow passage 212 are described. However, it is only required that the dimensional relationship and the inclination angle of the gas-liquid contact flow passage 212 be appropriately set based on the ratio between the low-boiling point component and the high-boiling point component in the raw material liquid, the intended separation performance, and the introduction flow speed (processing speed) of the raw material liquid in the raw material liquid introduction portion 120.

Further, in the above-mentioned embodiments, description is given by exemplifying the case in which the low-boiling point component and the high-boiling point component are liquids at normal temperature and normal pressure. However, the low-boiling point component may be a gas at normal temperature and normal pressure. For example, even when a raw material liquid containing ammonia and carbon dioxide as low-boiling point components is separated, the separation devices according to the above-mentioned embodiments can be used.

INDUSTRIAL APPLICABILITY

The present disclosure can be applied to a separation device configured to separate a raw material liquid containing a low-boiling point component and a high-boiling point component into a distillate and a bottom product.

REFERENCE SIGNS LIST

GL gas layer
100 separation device
130 first heat medium introduction portion (stripping section)
132 first heat medium discharge portion (stripping section)
140 second heat medium introduction portion (rectification section)
142 second heat medium discharge portion (rectification section)
152 distillate discharge port
162 bottom product discharge port
212 gas-liquid contact flow passage
214 raw material liquid introduction port
222 heat medium flow passage (stripping section, rectification section)
250 porous body (meandering flow passage forming portion)
600 separation device

What is claimed is:

1. A separation device, comprising:
   a gas-liquid contact flow passage having a distillate discharge port formed on one end side and a bottom product discharge port formed on another end side;
   a raw material liquid introduction port formed between the distillate discharge port and the bottom product discharge port in the gas-liquid contact flow passage;
   a stripping section, which is provided between the raw material liquid introduction port and the bottom product discharge port and is configured to heat a liquid in the gas-liquid contact flow passage;
   a rectification section, which is provided between the raw material liquid introduction port and the distillate discharge port and is configured to cool a gas in the gas-liquid contact flow passage; and
   a meandering flow passage forming portion, which is arranged in the gas-liquid contact flow passage and forms a meandering flow passage configured to cause a flow of the gas to meander;
   wherein
   a bottom surface of the gas-liquid contact flow passage is inclined vertically downward from the distillate discharge port to the bottom product discharge port.

2. A separation device according to claim 1, wherein the meandering flow passage forming portion is formed of a porous body.

3. A separation device according to claim 1, wherein the meandering flow passage forming portion is formed of one or more baffles extending in a direction crossing an imaginary straight line that connects the distillate discharge port and the bottom product discharge port to each other.

4. A separation device according to claim 1, further comprising:
   first ribs extending from the raw material liquid introduction port side to the bottom product discharge port side; and
   second ribs extending from the raw material liquid introduction port side to the distillate discharge port side;
   wherein
   the meandering flow passage forming portion is arranged from upper surfaces of the first ribs to upper surfaces of the second ribs.

5. A separation device according to claim 4, further comprising a raw material liquid distributor arranged on an end on the raw material liquid introduction port side of the first ribs or arranged in the vicinity of the end on the raw material liquid introduction port side of the first ribs,
   wherein the raw material liquid distributor includes one or more of:
   porous bodies arranged between adjacent first ribs;
   baffle plates arranged on the end on the raw material liquid introduction port side of the first ribs; and
   decreasing portions whose width gradually decreases from a predetermined position toward the end on the raw material liquid introduction port side of the first ribs.

* * * * *